(12) United States Patent
Killen (10) Patent No.: US 7,694,479 B2
(45) Date of Patent: Apr. 13, 2010

(54) STRUCTURE

(76) Inventor: Andrew Killen, 218 Scenic Drive, Merewether, New South Wales (AU) 2291

( * ) Notice: Subject to any disclaimer, the term of this patent is extended or adjusted under 35 U.S.C. 154(b) by 1230 days.

(21) Appl. No.: 10/478,335

(22) PCT Filed: May 23, 2002

(86) PCT No.: PCT/AU02/00642

§ 371 (c)(1),
(2), (4) Date: Nov. 19, 2003

(87) PCT Pub. No.: WO02/095154

PCT Pub. Date: Nov. 28, 2002

(65) Prior Publication Data

US 2004/0128948 A1    Jul. 8, 2004

(30) Foreign Application Priority Data

May 23, 2001    (AU)    ................................ PS1670

(51) Int. Cl.
*E04C 1/00*    (2006.01)
*E04C 1/40*    (2006.01)
*E04C 1/41*    (2006.01)

(52) U.S. Cl. .................. 52/309.5; 52/309.4; 52/309.12; 52/309.15; 52/309.16; 52/309.17; 52/80.2; 52/81.1; 52/89; 52/742.1; 52/742.14; 52/745.07

(58) Field of Classification Search ................ 52/309.4, 52/309.7, 309.8, 309.11, 309.12, 309.15, 52/309.16, 309.17, 80.1–80.2, 81.1–81.6, 52/86–89, 741.41, 742.1, 742.14, 745.07
See application file for complete search history.

(56) References Cited

U.S. PATENT DOCUMENTS

| | | | | |
|---|---|---|---|---|
| 1,770,521 A | * | 7/1930 | Hayes | 428/217 |
| 2,569,709 A | * | 10/1951 | Elmendorf | 144/361 |
| 3,007,205 A | * | 11/1961 | House | 264/171.24 |
| 3,106,227 A | * | 10/1963 | Crowley | 138/176 |
| 3,185,748 A | * | 5/1965 | Cleverly et al. | 264/261 |
| 3,192,099 A | * | 6/1965 | Foyster et al. | 428/71 |
| 3,353,315 A | * | 11/1967 | Barker | 52/275 |
| 3,425,889 A | * | 2/1969 | Willits, Jr. | 248/220.43 |
| 3,540,967 A | * | 11/1970 | Levine et al. | 156/363 |
| 3,969,868 A | * | 7/1976 | Bainter et al. | 428/201 |

(Continued)

FOREIGN PATENT DOCUMENTS

| | | |
|---|---|---|
| AU | 424478 B | 8/1968 |
| AU | 441310 A1 | 6/1971 |
| DE | 2843603 A1 | 4/1980 |
| FR | 2 286 250 A | 4/1976 |
| FR | 2710289 A1 | 3/1995 |

(Continued)

*Primary Examiner*—Jeanette Chapman
(74) *Attorney, Agent, or Firm*—Seyfarth Shaw LLP (57) ABSTRACT

A three-dimensional constructional element 10 is shown having opposing and substantially planar panels 30, 40 mounted on opposing surfaces of a flexible planar member in the form of a flexible mesh material layer 52 therefore making a composite sheet of three layers. Panel 30 includes transverse grooves 12, 14 formed therein and panel 40 includes transverse grooves 16, 18 formed therein. The structure is deformable about each groove 12, 14, 16, 18. In a preferred embodiment the panels 30, 40 are divided into many segments defined by the transverse grooves to allow the constructional element to be deformed so that one of the exterior surfaces of panel 30 is concave while the opposing exterior surface of panel 40 is convex. Also disclosed herein is a method of forming a curved surface structure including the steps of deforming the constructional element 10 into a desired position and securing the element 10 into that position by introducing a grouting material 74, 94 thereonto so that the grouting material can enter the grooves 12, 14, 16, 18 to rigidly affix the element 10.

8 Claims, 4 Drawing Sheets

U.S. PATENT DOCUMENTS

| | | | |
|---|---|---|---|
| 4,077,177 A * | 3/1978 | Boothroyd et al. | 52/745.07 |
| 4,259,824 A * | 4/1981 | Lopez | 52/612 |
| 4,292,783 A * | 10/1981 | Mulvihill | 52/741.4 |
| 4,454,702 A * | 6/1984 | Bonilla-Lugo et al. | 52/745.13 |
| 4,568,585 A | 2/1986 | Kohn | |
| 4,965,138 A * | 10/1990 | Gonzalez | 428/593 |
| 5,271,980 A * | 12/1993 | Bell | 428/68 |
| 5,373,674 A * | 12/1994 | Winter, IV | 52/309.9 |
| 5,404,687 A * | 4/1995 | Blake et al. | 52/600 |
| 5,900,299 A * | 5/1999 | Wynne | 428/69 |
| 6,106,449 A * | 8/2000 | Wynne | 493/101 |
| 6,112,489 A * | 9/2000 | Zweig | 52/405.1 |
| 6,119,422 A * | 9/2000 | Clear et al. | 52/309.8 |
| 6,205,728 B1 * | 3/2001 | Sutelan | 52/309.7 |
| 2005/0086904 A1 * | 4/2005 | Foley | 52/782.1 |

FOREIGN PATENT DOCUMENTS

| | | | |
|---|---|---|---|
| GB | 2 052 598 A | | 1/1981 |
| GB | 2051200 A | | 1/1981 |
| JP | 08209852 A | * | 8/1996 |
| JP | 09-300494 A | | 11/1997 |
| JP | 10237994 A | * | 9/1998 |
| WO | WO 85/04922 A1 | | 11/1985 |

* cited by examiner

STRUCTURE

CROSS REFERENCE TO RELATED APPLICATION

This application is a US National Phase of International Patent Application serial No. PCT/AU02/00642, filed May 23, 2002 which claims the priority of Australian Patent Application serial No. PS 1670, filed May 23, 2001.

FIELD OF THE INVENTION

The present invention relates to a three-dimensional structure particularly for use as a building component. The device can be used in a broad range of applications as part of a wall, roof, floor, lining or a cladding in domestic, commercial or industrial applications and will primarily be described with reference to this context. It should be remembered, however, that the invention has broader use as a structure in a wide variety of applications such as model making, sculpture, in furniture, vehicles, boats, aircraft and the like.

BACKGROUND ART

Most building materials are manufactured in flat, straight or extruded pieces. The components of buildings are mostly constructed to be level with either a horizontal or vertical plane having flat surfaces with boxed, square or rectangular forms.

When a curved surface or finish is required in a structure it is achieved either by a complex and expensive method of bending the available traditionally straight materials or making the curved surface from many smaller components fixed at an angle to each other. To make a dome or a complex arched or vaulted surface in three dimensions, the process is even more complicated. The form is generally achieved by making a temporary form or mould into which material such as concrete is poured to create the structure. This is extremely labour intensive, complex and prohibitive from an economic viewpoint. This is generally why curved surfaces are rare in constructed buildings.

Furthermore, building materials such as thin sheets can generally be curved or bent into a cylinder shape, that is, along one axis such as the x axis. The same sheet could also be independently bent along the y axis but bending over both the x and y axis at the same time to form a portion of a sphere or a dome is normally not possible. Unless specially treated with heat and pressure in a mould, materials such as plasterboard, sheet aluminium, sheet steel, plastic or particleboard or the like cannot be deformed simultaneously in two or even three planes.

Currently the bending of these materials is problematic and often requires a solid permanent framework to hold the desired curves in shape. The framework is also complex and is often made up of segments of straight material.

SUMMARY OF THE INVENTION

In a first aspect the present invention provides a constructional element including:
  a flexible and substantially planar member; and
  opposing panels each mounted at respective opposing surfaces of the flexible planar member, each of the panels having at least one groove which extends the thereinto,
wherein the flexible planar member is deformable at the at least one groove which is adapted to be at least partly filled thereafter to retain the constructional element in a deformed position.

Preferably in the deformed position at least part of an outer surface of one of the panels is shaped concave while an opposing part of an outer surface of the opposing panel is shaped convex.

Preferably each panel is defined by a plurality of blocks having said groove/s disposed therebetween.

Preferably the blocks are substantially unstressed when in the deformed position.

Preferably the panels substantially conceal the flexible planar member.

Preferably the or at least some of the grooves in use are filled with a material which becomes rigid.

Preferably the or at least some of each of the grooves in use are at least partially filled by one or more reinforcing element/s.

Preferably the at least one groove extends between opposing edges of each panel.

Preferably the at least one groove extends to a depth in each respective panel near to or at the position where the panel is mounted to the flexible member.

Preferably the structure is elongate and the one or more grooves are transverse grooves extending between opposing longitudinal edges of the panels.

Preferably the transverse grooves are a plurality of substantially parallel and spaced apart grooves.

Preferably the constructional element further including one or more longitudinal grooves arranged orthogonal to the transverse grooves.

Preferably the longitudinal grooves are a plurality of substantially parallel and spaced apart grooves.

Preferably said grooves on respective of the opposing surfaces are aligned.

Preferably each groove follows a straight line.

Preferably the panels are substantially planar.

In a second aspect the present invention provides a constructional element including:
  a flexible and substantially planar member; and
  opposing panels each mounted at respective opposing surfaces of the flexible planar member, each of the panels having at least two elongate grooves which extend thereinto to each define an axis, each groove in each panel angularly disposed with respect to the at least one other groove, and each groove in respective of the opposing panels being substantially aligned, wherein the flexible planar member is deformable along the axis of each of the grooves to allow deformation of the constructional element in three dimensions about said at least two axes.

Preferably the grooves of the second aspect are as defined in the first aspect.

In a third aspect the present invention provides a method of forming a structure including the steps of:
  providing a constructional element as claimed in the first or second aspects; and
  at least partially filling at least some of the plurality of grooves with a material to retain the constructional element in a desired position.

Preferably the constructional element is moved into the desired position either prior to or subsequent to the filling step. Most preferably the desired position occurs when the constructional element is curved.

Preferably the material is a grouting material which affixes to the constructional element and becomes rigid after filling.

Alternatively the material comprises one or more reinforcing element/s in use which give the structure rigidity. In such instances, the material preferably further comprises a grouting material and wherein the or each reinforcing element is at least partially embedded within the grouting material.

Preferably the method of the third aspect also includes the step of coating at least one surface of the now grouted and/or reinforced structure with a surface coating material.

Preferably the method also includes the steps of securing the constructional element into the desired position prior to grouting or reinforcing, and the subsequent step of releasing the now rigid deformed structure from being secured in the desired position.

In a fourth aspect the present invention provides a method of forming a structure including the steps of:
  providing a constructional element comprising:
    a flexible and substantially planar member; and
    opposing panels each mounted at respective opposing surfaces of the flexible planar member, each of the panels having at least two elongate grooves which extend thereinto to each define an axis, each groove in each panel angularly disposed with respect to the at least one other groove, and each groove in respective of the opposing panels being substantially aligned, wherein the flexible planar member is deformable along the axis of each of the grooves to allow deformation of the constructional element in three dimensions about said at least two axes; and
  coating at least one exterior surface of the constructional element with a surface coating material.

Preferably the constructional element is moved into a desired position prior to the coating step. Most preferably the desired position occurs when the constructional element is curved.

Preferably the method of the fourth aspect also includes the steps of securing the constructional element into the desired position prior to coating, and the subsequent step of releasing the structure from being secured in the desired position.

Most preferably the surface coating material is flexible.

In a fifth aspect the present invention provides a building system comprising:
  a constructional element as defined in the first and second aspects; and
  material for affixing the constructional element into a desired position by either at least partially filling one or more of the groove/s.

Preferably the material for at least partially filling the one or more of the groove/s includes a material which becomes rigid.

Preferably the material for at least partially filling the one or more of the groove/s includes a reinforcing element.

In a sixth aspect the present invention provides a building system comprising:
  a constructional element comprising:
    a flexible and substantially planar member; and
    opposing panels each mounted at respective opposing surfaces of the flexible planar member, each of the panels having at least two elongate grooves which extend thereinto to each define an axis, each groove in each panel angularly disposed with respect to the at least one other groove, and each groove in respective of the opposing panels being substantially aligned, wherein the flexible planar member is deformable along the axis of each of the grooves to allow deformation of the constructional element in three dimensions about said at least two axes; and
  a coating for use as a surface coating on at least one exterior surface of the constructional element.

Preferably the surface coating material of the sixth aspect is flexible.

In a seventh aspect the present invention provides a fastener when used for joining two constructional elements as defined in the first or second aspects, the fastener comprising a plate having on each opposing side thereof one or more projections engageable in use with a panel of said constructional elements.

Preferably the fastener further comprises a second plate, the second plate also having an each opposing side thereof one or more projections engageable in use with a panel of said constructional elements, the second plate angularly disposed to the plate.

Preferably in use the plate is positionable between a respective outer surface of two adjacent panels, the projections at least partly insertable into said panels.

In an eighth aspect the present invention provides a building system comprising;
  two constructional elements as defined in the first or second aspects wherein at an edge of each element, one of the opposing panels terminates inwardly from the other of the panels to define a shoulder region;
  the elements being arranged to be aligned with the shoulders of the respective elements overlapping; and
  a fastener as defined in the seventh aspect locatable at the overlapping shoulder region of the elements so that the projection(s) engage with the panels of each element.

Preferably the building system of the eighth aspect has a support plate positionable at an exterior surface of the or each of the constructional element(s) at the shoulder region, the support plate(s) being arranged for receipt of a screw for fastening the plate to the or each constructional element.

Preferably the fastener is also operative to receive the screw.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 16b shows a side view of the fixing plate of FIG. 16a.

FIG. 16c shows a perspective view of the fixing plate of FIG. 16a.

FIG. 17b shows a side view of the fixing plate of FIG. 17a.

FIG. 17c shows a perspective view of the fixing plate of FIG. 17a.

MODES FOR CARRYING OUT THE INVENTION

Figures 1, 2, 3, 4:
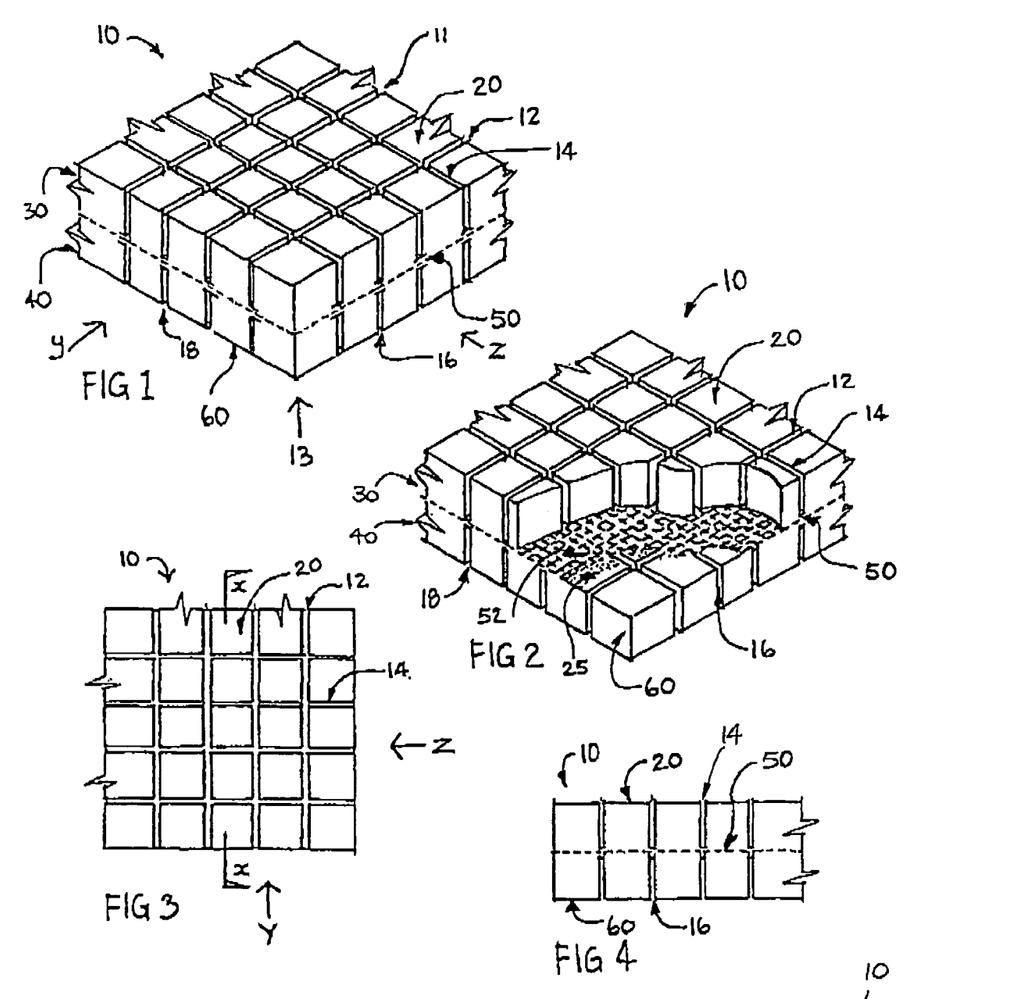
FIG. 1 shows a perspective view of one embodiment of a three dimensional structure in accordance with the invention.
FIG. 2 shows a part-sectional view of the embodiment of FIG. 1.
FIG. 3 shows a plan view of part of the embodiment shown in FIG. 1.
FIG. 4 shows a side view of the embodiment shown in FIG. 1 looking from the direction arrow Z shown in FIG. 1 and FIG. 3.
Figure 5:
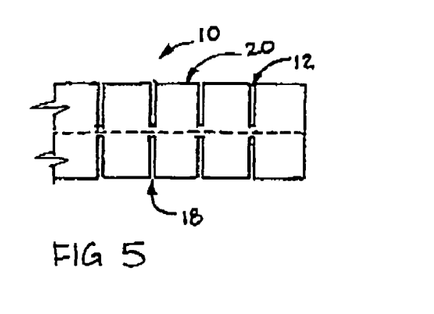
FIG. 5 shows a side view of the embodiment shown in FIG. 1 looking from the direction arrow Y shown in FIG. 1 and FIG. 3.
Figure 6:
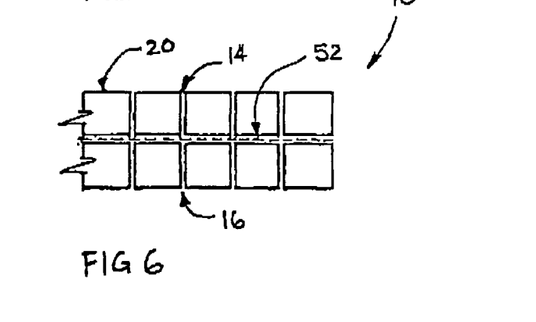
FIG. 6 shows a cross-sectional view of the embodiment of FIG. 1 taken on the line X-X of FIG. 3.

Referring to the drawings, a three-dimensional structure is shown in the form of flexible sheet 10. In the particular orientation shown, the sheet 10 includes an upper planar element in the form of an upper panel 30 which has an uppermost surface 11 and a lower planar element in the form of a lower panel 40 which has a lowermost surface 13. The upper panel 30 includes grooves 12, 14 formed in the uppermost surface 11 and the lower panel 40 includes grooves 16, 18 formed in the lowermost surface 13.

In the preferred embodiment shown, the grooves 12, 14 in the uppermost surface 11 are orthogonal to one another and arranged in a grid pattern which separates the uppermost surface 11 into a plurality of upper surface segments or blocks 20. In the embodiment shown, the pattern of grooves 12, 14 in the lowermost surface 13 is identical to the pattern of grooves 16, 18 in the uppermost surface 11 and separates the lowermost surface 13 into a plurality of lower surface segments or blocks 60. Each groove 12, 14, 16, 18 extends from one edge of the sheet 10 to the opposite edge of the sheet 10 in a straight line. However, the grooves can be arranged in other, patterns such as, for example, an uneven grid, a diagonal grid, a honeycomb pattern or even geometric curves or other random or ordered groove arrangements.

The grooves in the upper panel 30 and in the lower panel 40 do not meet and therefore do not cut the sheet 10 right through. In particular, the respective transverse grooves 12, 18 and the respective orthogonal grooves 14 and 16 do not meet and therefore do not cut the sheet 10 right through. A substantially planar member in the form of centre layer 50 remains uncut and therefore keeps the plurality of upper and lower surface segments together in a single sheet. In the preferred embodiment shown, this centre layer is a flexible mesh material 52 bonded to the material making up the upper panel 30 and also bonded to the material making up the lower panel 40, therefore making a composite sheet 10 of three layers. However, it would be possible in accordance with this invention to arrange more layers to make up the whole sheet. Furthermore there is no requirement for the centre layer 50 to be in the geometric 'centre' of the flexible sheet 10, since the upper panel 30 and the lower panel 40 can be of any thickness.

Referring to FIG. 2 the sheet 10, is made up of three layers including the upper panel 30, the lower panel 40 and the centre layer shown as a flexible mesh or grid mat material 52 with adhesive used to bond the flexible mesh between the upper panel 30 and the lower panel 40. A preferred method of manufacture of the preferred embodiment would be to lay the lower panel 30 on a flat surface. A typical suitable panel material is a sheet of expanded polystyrene (EPS) or the like of typical dimensions approximately 40 mm thick and of length 4 m and width 2 m. The next step of manufacture is to apply a suitable adhesive 25 to the entire upper surface of the lower panel 40. The next step is to lay the flexible mesh 52 over the adhesive 25, and then to apply further adhesive 25 on top of that mesh 52. The next step is to lay the upper panel 30 over the adhesive and flexible mesh 52. Pressure is then applied to ensure a suitable bond in the composite flexible sheet 10. Once the adhesive is set or cured, the grooves 12, 14, 16, 18 in the composite flexible sheet 10 are cut by mechanical means, typically a saw, router or knife, or in the case of EPS a hot wire may be an economical method. Typically the grooves have parallel opposing sides and the groove is of substantially even width throughout its depth.

The material used for the centre layer 50 is selected to best suit the application for which the flexible sheet 10 is intended. Typical example materials include a flexible fibreglass cloth or woven net material that can allow the adhesive to penetrate the weave. Such material together with the adhesive can remain flexible and are not affected by the hot wire cutting of the EPS upper and lower panels. Depending on the application, the material of the centre layer 50 can also be chosen to add some amount of resilience or strength to the flexible sheet 10 if required.

Once cutting of the panels 30, 40 is complete each upper surface segment or block 20 and lower surface segment or block 60 is securely attached to the centre layer 50 mainly on one surface only. These box-shaped segments or blocks 20 and 60 are linked to an adjacent box shaped segment via their respective attachment to the centre layer 50.

Figure 7:
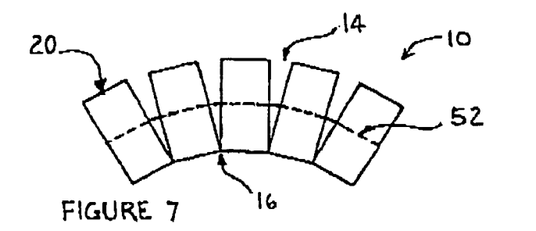
FIG. 7 shows a sectional view of the embodiment of FIG. 1 taken on the line X-X of FIG. 3 where the structure is deformed into a shape having a curved cross-section.

Referring now to FIG. 7, as the sheet 10 is bent in a arched or curved form the grooves 14 on the uppermost surface of the sheet 10 widen or form a "V" shape and correspondingly the grooves 16 become narrower or close completely to allow the sheet 10 to bend. When the sheet is deformed whether the grooves form a "V" or a fully closed groove depends on the thickness of the groove and the flexibility of the sheet material. The grooves 14 can subsequently be filled with a grouting material in order to cause the flexible sheet 10 to retain its deformed (curved) position.

In the embodiment shown in FIG. 7, the blocks 20, 60 are substantially unstressed when the flexible sheet is deformed. The blocks 20, 60 can be moved into contact with one another at an outermost edge of the flexible sheet but the blocks 20, 60 normally themselves do not undergo compression or physical stress. Of course with some panel materials, compression and/or deformation of a minor nature may occur but usually the full closure of a groove 16 is as far as the flexible sheet 10 can deform, thus concealing from view the centre layer flexible mesh 52.

Figure 8:
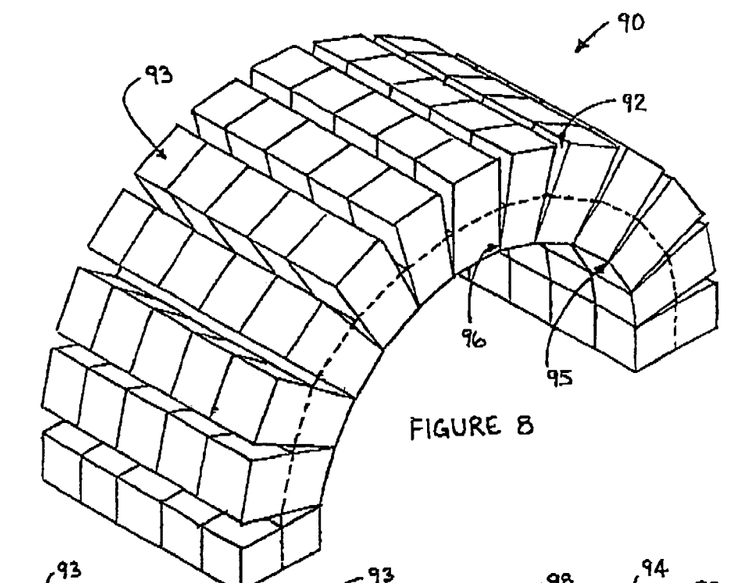
FIG. 8 shows a perspective view of a further embodiment of a three dimensional structure in accordance with the invention wherein the three dimensional structure is deformed into a curved shape.
Figure 9:
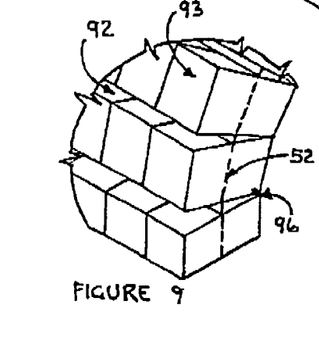
FIG. 9 shows an inset detail of part of the device shown in FIG. 8 illustrating the grooves on one surface of the structure.
Figure 10:
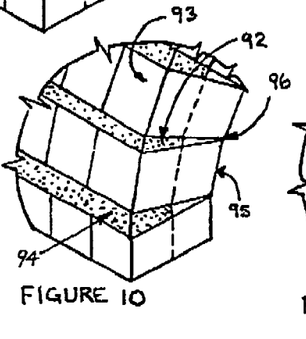
FIG. 10 shows the same view of the embodiment of FIG. 9 illustrating the grooves on one surface of the structure when filled with a grouting material.
Figure 11:
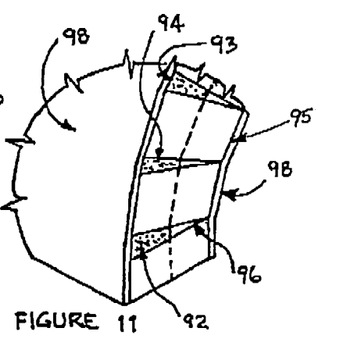
FIG. 11 shows the same view of the embodiment of FIG. 10 illustrating a surface coating applied to the exterior of the structure over those grooves filled with a grouting material.

Referring now to FIG. 8 and to a different embodiment of the flexible sheet 90, as well as to the detailed views shown in FIGS. 9 to 11, the "V-shaped" grooves 92 located on an uppermost surface 93 of the deformed sheet 90 are filled with a grouting material 94, while the grooves 96 located on the lowermost surface 95 of the deformed sheet 90 are compressed and closed at their outermost end. When the grouting 94 is cured, the then deformed and rigid curved sheet 90 is coated at both its upper 93 and lower 95 surfaces with a surface coating material 98 (as shown in FIG. 11) to complete the formation of a rigid and stable curved surface for use as a building component.

Figure 12:
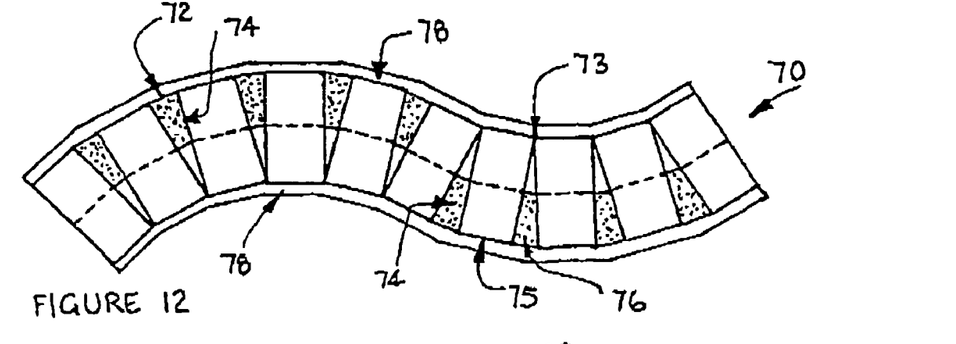
FIG. 12 shows a cross-sectional view of a further embodiment of a three dimensional structure in accordance with the invention wherein the three dimensional structure is deformed into a double curve or S shape, the open grooves on each surface of the structure are filled with a grouting material and a surface coating is applied to the exterior of both surfaces of the structure over those filled grooves.
Figure 13:
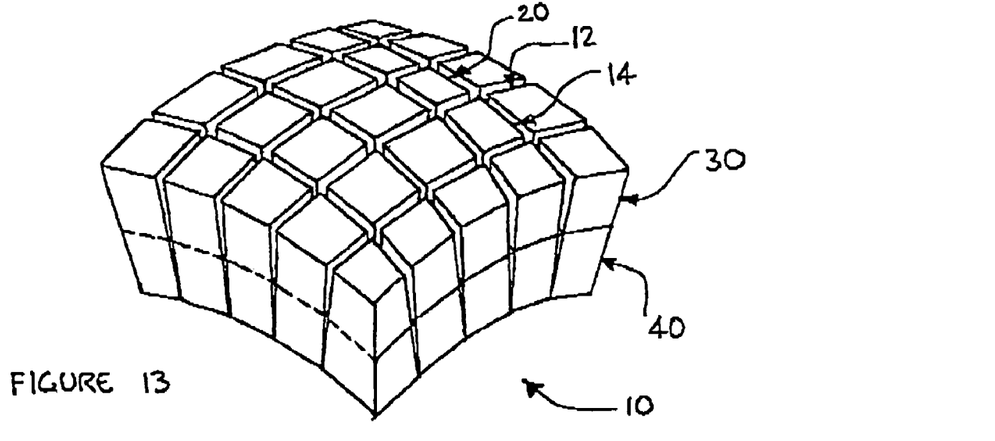
FIG. 13 shows a perspective view of the embodiment of FIG. 1 wherein the three dimensional structure is deformed into a domed shape.

Referring now to FIG. 12, and to a different embodiment of the flexible sheet 70, the "V-shaped" grooves 72 located on a portion of an uppermost surface 73 of the deformed sheet 70 are filled with a grouting material 74, while the "V-shaped" grooves 76 located on a portion of the lowermost surface 75 of the deformed sheet 70 are also filled with a grouting material 74. When the grouting 74 is cured, the then deformed and rigid sheet 70 is coated at both its upper 73 and lower 75 surfaces with a surface coating material 78 to complete the formation of a rigid and stable curved or undulating surface for use as a building component.

In general, when the sheet material is bent or flexed into any domed, curved or bent shape, the grooves on the surface facing the outside of the dome, curve or bend (the convex surface) become wider while the corresponding grooves on the opposite surface which faces the inside of the dome, curve or bend (the concave surface), close or become narrower. Insertion of a hardenable grouting material in those open grooves allows the sheet to form a rigid bent, curved or undulating surface as desired.

Coating the then rigid sheet on at least one side with a range of materials including cementaceous render, modified or reinforced rendering material, fibreglass matting, resin, paint or the like can then improve the characteristics of the sheet with regard to strength, longevity, watertightness, durability and visual appeal.

In another embodiment the flexible sheet need not be grouted to form the rigid sheet, but can be coated in its flexible state. For example the flexible sheet may also be covered with a flexible fabric or elastic membrane allowing the flexible sheet to flex by pneumatic, hydraulic or other mechanical means.

In this or another embodiment, the flexible sheet can be reinforced by a number of other methods. Prior to grouting or after an initial grout application, reinforcement in the form of cables, rods, rope, mesh, fabric, wire netting or the like may be located within the grout or within the grooves on one or both surfaces of the sheet in such a way to improve the strength of the finished material. This reinforcing means can be laid loose, tensioned, pre-tensioned or post-tensioned depending on the application. The reinforcement way be tied or linked through the flexible panels to the reinforcement on the corresponding opposite surface and can also be adjustable if required. In other embodiments, this reinforcement may be attached to the flexible mesh material 52 located between the upper and lower surface of the flexible sheet during the manufacturing of the sheet.

Figure 14:
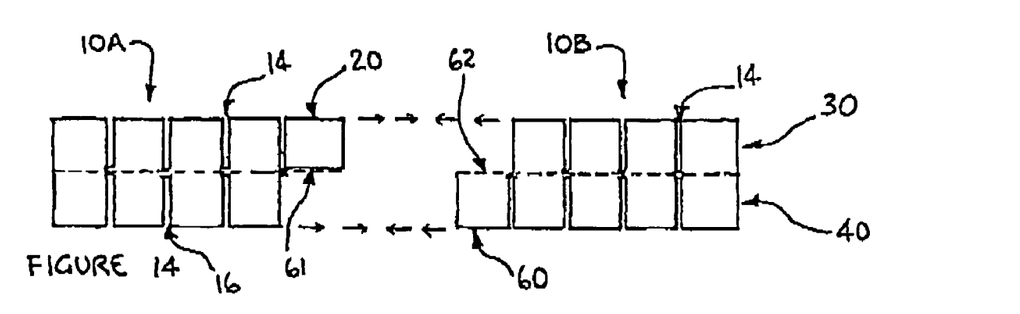
FIGS. 14 and 15 is show a side view of a further embodiment of a three dimensional structure in accordance with the invention wherein two three dimensional structures (FIG. 14) are joined to form a single structure (FIG. 15).
Figure 15:
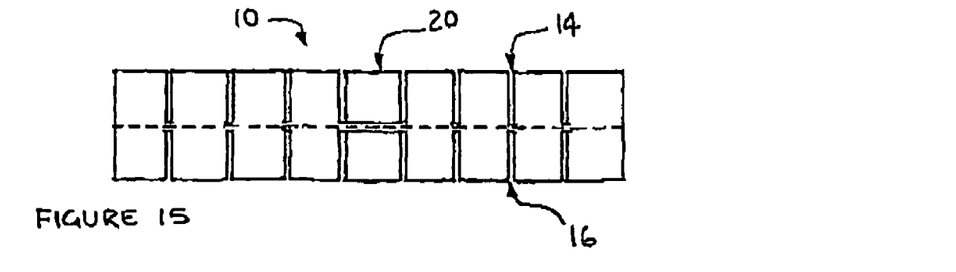

In a further embodiment of the invention, the flexible sheet 10A can be joined to another similar sheet 10B as shown in FIGS. 14 and 15. Referring to FIG. 14, where the flexible sheets 10A, 10B have a respective overlapping upper surface segment 20 and lower surface segment 60, the respective portions 61, 62 of the flexible mesh or grid mat which support each these segments 20, 60 can be bonded to one another by use of an adhesive 25 or similar substance in order to join the sheets 10 and 10A together as shown in FIG. 15.

Figure 16A:
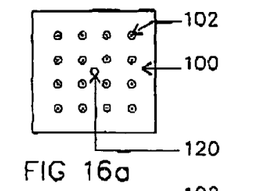
FIG. 16a shows a plan view of a fixing plate used to join portions of the three-dimensional structure in accordance with the invention.
Figure 16B:
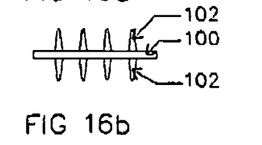
Figure 16C:
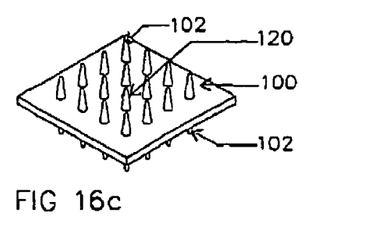
Figure 17A:
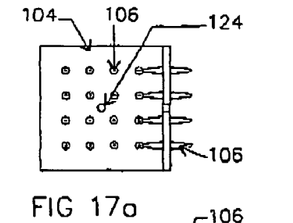
FIG. 17a shows a plan view of a fixing plate used to join portions of the three-dimensional structure in accordance with the invention.
Figure 17B:
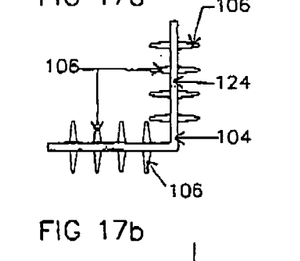
Figure 17C:
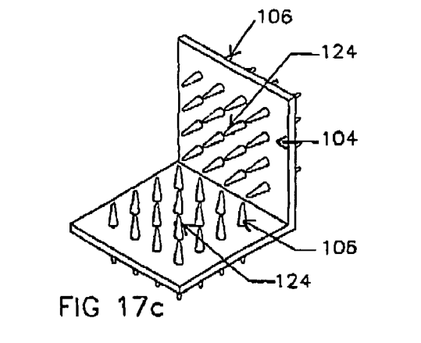

Furthermore the joining of one flexible sheet to another flexible sheet or the joining of the flexible sheet to any other surface object or material can be achieved by the use of adhesives, nuts and bolts, screws, nails, barbs or other generally available mechanical fixing. Other new fixing arrangements of various types are illustrated in FIGS. 16 and 17 which can be used in conjunction with screws, bolts and washers etc to perform a number of fixing requirements. Illustrations of these fixings in use are given in FIGS. 18 and 19 respectively.

In FIG. 16 a square planar fixing plate 100 having multiple spikes 102 protruding from both planar faces can be inserted into two adjacent flexible sheets 10A, 10B to positively engage or grip the sheet materials. An elbow bracket 104 having multiple spikes 106 protruding from each planar face is shown in FIG. 17 for insertion into several flexible sheets at once to positively engage or grip the materials together.

Figure 18:
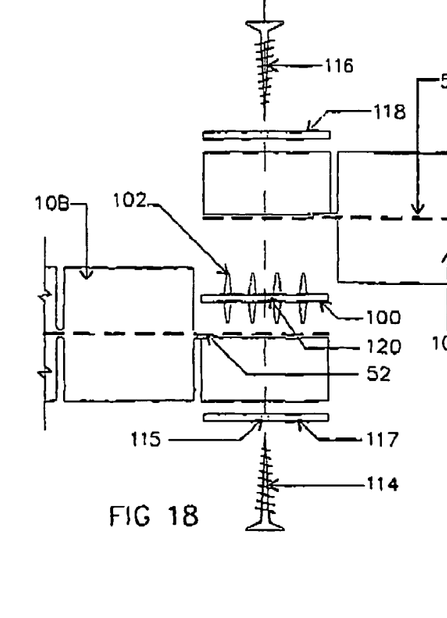
FIG. 18 shows a side view of a fixing plate of FIG. 16 when in use to join portions of the three-dimensional structure in accordance with the invention.
Figure 19:
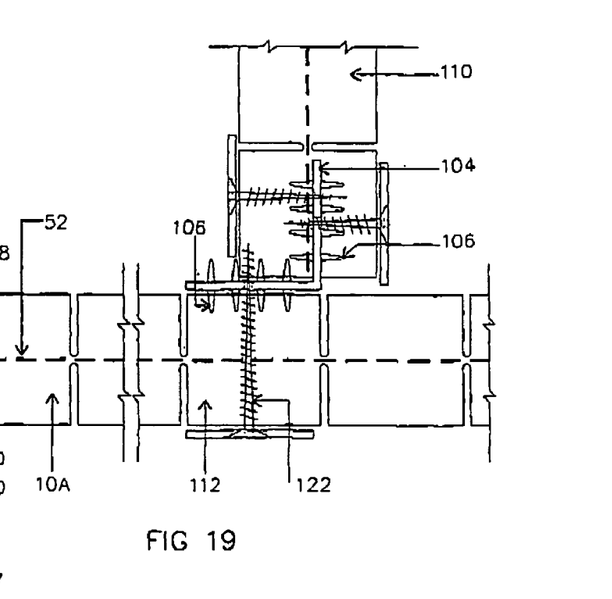
FIG. 19 shows a side view of a fixing plate of FIG. 17 when in use to join portions of the three-dimensional structure in accordance with the invention.

The fixing plate 100 of FIG. 16 is shown in use in FIG. 18 joining two portions of a flexible sheet 10A, 10B. The fixing plate of FIG. 17 is shown in use in FIG. 19 joining two flexible sheets 110, 112 together in a particular arrangement. In addition to the application of a suitable adhesive to make a join, the fixing plates 100, 104 can be inserted into the sheet/s and fastened in place to strengthen the joint. In FIG. 18, a screw 114 can be inserted through a hole 115 formed in a washer 117 and then inserted into the sheet material 10B. A similar screw 116 and washer 118 arrangement can be used on the opposing side of sheet 10A. In some embodiments, the screw can be long enough to penetrate the sheet 10A and be inserted through a threaded hole 120 formed in the fixing plate 100. In FIG. 19, for example, screw 122 penetrates the sheet 112 and is inserted through a threaded hole 124 formed in the elbow bracket 104. Further fastening screws and washers are inserted through the orthogonal portion of the elbow bracket 104 to fasten to the sheet 110. In further embodiments other fasteners such as nails, bolts or the like can be used to help grip the sheet/s. In still further embodiments the fixing plate 100 and the elbow bracket 104 can have more than one hole 120, 124 to retain the screws, nails, bolts or the like therethrough in use.

Variations of this method may also be used to join sheets at right angles or any other angle in order to form more complex shapes as illustrated in FIG. 19. This method may also be used to fix a sheet onto a frame or support structure. Typically the fixing plate 100, 104 is made from a strong rigid material such as nylon, plastic, PVC, metal etc. Preferably when one or more such devices 100, 104 are attached to a sheet they can be bent at an angle to each other so that the "L" or even "U" shaped brackets need not only form 90° bends thus allowing fixings to occur at any desirable angle.

The apparatus and method of forming a curved surface structure has many advantages. The curved sheet can be constructed in many thicknesses from only a few millimetres for small applications requiring tightly curved shapes to hundreds of millimetres thick for large building applications. The apparatus and method of the invention is relatively simple to manufacture, store, transport, construct and maintain and the base materials are readily available. Persons of only moderate building skills can be employed to construct complex and individual shapes with the apparatus and method of the invention. Moulds are now no longer required to construct simple or complex curved shapes. In some instances, smaller scale models using thin sheets can be made to determine the exact shape and characteristics of a final larger construction using the thicker sheet. This is of great advantage to builder and architects as curved shapes are often difficult to imagine, detail and resolve exact setouts and sizes.

Furthermore, the flexible sheet apparatus can be joined to another sheet easily and economically prior to the application of finishes and decorative treatment. The sheet is lightweight even when completed, and therefore the strength required to support its own weight is less than other forms of construction.

In use, the sheet can be used both as a decorative non-loadbearing material or a functional load-bearing floor, wall and roof material using the same principles of manufacture with selected and appropriate materials and application techniques.

It should be noted that this invention described would also be suitable for non-building type application such as furniture, model making, manufacturing of components, objects and surfaces that may be required to be curved, for example in such diverse applications as sculpture, furniture, vehicles, and boat hulls etc.

Whilst the invention has been described with reference to a number of preferred embodiments it should be appreciated that the invention can be embodied in many other forms.

It is to be understood that, if any prior art publication is referred to herein, such reference does not constitute an admission that the publication forms a part of the common general knowledge in the art, in Australia or any other country.

The invention claimed is:

1. A constructional element including:
   a flexible and substantially planar member; and
   opposing panels each mounted at respective opposing surfaces of the flexible planar member, each of the panels having at least two elongate grooves which extend thereinto from the outer face of each panel to each define an axis;
   wherein each panel is defined by a plurality of rigid blocks having said grooves disposed therebetween each groove in each panel being angularly disposed with respect to the at least one other groove, and each groove in one panel being substantially aligned with a corresponding groove in the other panel;
   wherein the flexible planar member is deformable along the axis of each of the grooves to thereby allow deformation of the constructional element in three dimensions;
   the grooves being adapted to be at least partially filled thereafter in use with a grout material which becomes rigid to retain the constructional element in the three dimensionally deformed position.

2. A constructional element as claimed in claim 1 wherein the blocks are substantially unstressed when in the deformed position.

3. A constructional element as claimed in claim 1 wherein the panels substantially conceal the flexible planar member.

4. A constructional element as claimed in claim 1 wherein the grooves extend between opposing edges of each panel.

5. A constructional element as claimed in claim 1 wherein the at least one groove extends to a depth in each respective panel member near to or at the position where the panel is mounted to the flexible member.

6. A constructional element as claimed in claim 1 wherein the panels are substantially planar.

7. A method of forming a structure including the steps of:
   providing a constructional element as claimed in claim 1; and
   at least partially filling at least some of the grooves with a grout material to retain the constructional element in a desired position.

8. The method according to claim 7 wherein the method also includes the step of coating at least one surface of the now grouted structure with a surface coating material.

* * * * *